(12) United States Patent
Oh

(10) Patent No.: US 10,466,653 B2
(45) Date of Patent: Nov. 5, 2019

(54) SMART GLASSES AND WRISTWATCH INCLUDING THE SAME

(71) Applicant: Young Gwun Oh, Pyeongtaek-si (KR)

(72) Inventor: Young Gwun Oh, Pyeongtaek-si (KR)

( * ) Notice: Subject to any disclaimer, the term of this patent is extended or adjusted under 35 U.S.C. 154(b) by 161 days.

(21) Appl. No.: 15/824,297

(22) Filed: Nov. 28, 2017

(65) Prior Publication Data

US 2018/0081325 A1  Mar. 22, 2018

Related U.S. Application Data

(63) Continuation of application No. PCT/KR2016/005092, filed on Jun. 1, 2016.

(30) Foreign Application Priority Data

Jun. 1, 2015 (KR) ........................ 10-2015-0077015

(51) Int. Cl.
*G04G 17/08* (2006.01)
*G04B 47/00* (2006.01)
(Continued)

(52) U.S. Cl.
CPC ......... *G04G 17/08* (2013.01); *G02B 27/0176* (2013.01); *G02C 3/04* (2013.01); *G02C 5/006* (2013.01); *G02C 11/10* (2013.01); *G04B 37/12* (2013.01); *G04B 47/00* (2013.01); *G04G 17/045* (2013.01); *G04G 19/00* (2013.01); *G04G 21/00* (2013.01); *G02B 2027/0178* (2013.01)

(58) Field of Classification Search
CPC .... G04B 37/12; G04B 37/127; G04G 17/045; G04G 17/08; G04G 19/00; G04G 21/00; G02C 3/04; G02C 5/006; G02C 11/10
See application file for complete search history.

(56) References Cited

U.S. PATENT DOCUMENTS 5,065,373 A * 11/1991 Alcantara Maia ... G04B 37/127
368/10
5,455,640 A * 10/1995 Gertsikov .............. G02C 11/00
351/158
(Continued)

FOREIGN PATENT DOCUMENTS

JP          52023371 A  *  2/1977  ............. G04G 17/08
JP       2004-219429 A      8/2004
(Continued)

OTHER PUBLICATIONS

International Search Report issued in PCT/KR2016/005092; dated Sep. 2, 2016.

*Primary Examiner* — Sean P Kayes
*Assistant Examiner* — Jason M Collins
(74) *Attorney, Agent, or Firm* — Studebaker & Brackett PC

(57) ABSTRACT

A wristwatch includes a watch body having a display unit including a seating part formed on an outer frame of the display unit, and smart glasses having a temple tip detachably coupled to the seating part to constitute at least a portion of a case body or a bezel of the watch body and surrounding at least a portion of the outer frame of the display unit. The temple tip of the smart glasses is formed in a shape corresponding to the seating part of the watch body to surround the outer frame of the display unit of the watch body while being mounted on the watch body and supported by the watch body.

19 Claims, 16 Drawing Sheets

(51) Int. Cl.
*G02B 27/01* (2006.01)
*G02C 11/00* (2006.01)
*G04G 19/00* (2006.01)
*G04G 21/00* (2010.01)
*G04G 17/04* (2006.01)
*G02C 3/04* (2006.01)
*G02C 5/00* (2006.01)
*G04B 37/12* (2006.01)

(56) References Cited

U.S. PATENT DOCUMENTS

| | | | | |
|---|---|---|---|---|
| 7,748,843 B2* | 7/2010 | Stewart | ............... | G02C 11/02 |
| | | | | 351/158 |
| 9,033,491 B2* | 5/2015 | Allen | ............... | G02C 3/04 |
| | | | | 351/158 |
| 2008/0036962 A1* | 2/2008 | Alitowski | ............... | G02C 5/08 |
| | | | | 351/63 |
| 2015/0243068 A1* | 8/2015 | Solomon | ............... | G02B 27/017 |
| | | | | 345/419 |

FOREIGN PATENT DOCUMENTS

| KR | 10-0642310 B1 | 11/2006 |
|---|---|---|
| KR | 20-2012-0000828 U | 2/2012 |
| KR | 10-2012-0033370 A | 4/2012 |
| KR | 10-2014-0106849 A | 9/2014 |

* cited by examiner

SMART GLASSES AND WRISTWATCH INCLUDING THE SAME

CROSS-REFERENCE TO RELATED APPLICATIONS

The present application is a continuation of International Patent Application No. PCT/KR2016/005092, filed on Jun. 1, 2016, which is based upon and claims the benefit of priority to Korean Patent Application No. 10-2015-0077015, filed on Jun. 1, 2015. The disclosures of the above-listed applications are hereby incorporated by reference herein in their entirety.

BACKGROUND

Embodiments of the inventive concept described herein relate to smart glasses which can be used by transforming a smart watch or a wristwatch serving as the prototype of the smart watch or detaching only a portion of elements of the wristwatch, thereby improving portability and the convenience of use of the smart glasses, and can maintain the beauty of the wristwatch as the smart glasses are used by detaching or transforming the original elements of the wristwatch.

Recently, under a situation that a wearable computing system is spread, smart glasses have been spread, in which the smart glasses are able to provide various types of data for a user through glass in the state that the user wears the smart glasses like eyeglasses. Among them, "Google Glass" is a product name announced by Google.

However, the smart glasses cause the user inconvenience in terms of portability thereof since a person, who does not usually wear the smart glasses, has to always wear the smart glasses or to separately prepare for a bag when carrying with a glasses case into which the smart glasses is to be put. In the case that the user always wears the smart glasses, the smart glasses are strongly repulsed to the extent that the smart glasses are criticized as "a perfect stalker article". Currently, Google stops producing the smart glasses.

SUMMARY

Embodiments of the inventive concept provide smart glasses which can be usually used for a wristwatch by utilizing a portion or an entire portion of a bezel or a case body of a smart watch terminal or the wristwatch (hereinafter, collectively referred to as "wristwatch") serving as to the prototype of the smart watch, and can perform the function of the smart glasses through simple detaching or transform if necessary, thereby improving portability and the convenience of use of the smart glasses. The smart glasses employ a portion of a basic body of the wristwatch to maintain the beauty of the wristwatch.

The objects which will be achieved in the inventive concept are not limited to the above, but other objects, which are not mentioned, will be apparently understood to those skilled in the art.

According to an embodiment of the invention concept, a wristwatch includes a watch body having a display unit including a seating part formed on an outer frame of the display unit, and smart glasses having a temple tip detachably coupled to the seating part to constitute at least a portion of a case body or a bezel of the watch body and surrounding at least a portion of the outer frame of the display unit. The temple tip of the smart glasses is formed in a shape corresponding to the seating part of the watch body to surround the outer frame of the display unit of the watch body while being mounted on the watch body and supported by the watch body.

According to another embodiment of the inventive concept, a wristwatch includes a watch body having a display unit including a seating part formed on an outer frame of the display unit, a band allowing a user to put the watch body on a wrist of the user, smart glasses having a temple tip, which is detachably coupled to the seating part to constitute a case body or a bezel of the watch body and surrounds the outer frame of the display unit, and a temple which extends from the temple tip and is detachably coupled to the band, and an inner frame retractably provided inside the temple such that a length of the temple is adjustable.

According to still another embodiment, a wristwatch includes a lens frame which surrounds a transparent display part, which displays time or an image, and constitutes a watch body, a pair of temples provided on the lens frames while interposing the transparent display part between the pair of temples to be transformable into a band put on a wrist of a user, a pair of temple tips mutually separately respectively coupled to the pair of temples, and an inner frame retractably provided inside the pair of temples such that a length of the temple is adjustable.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
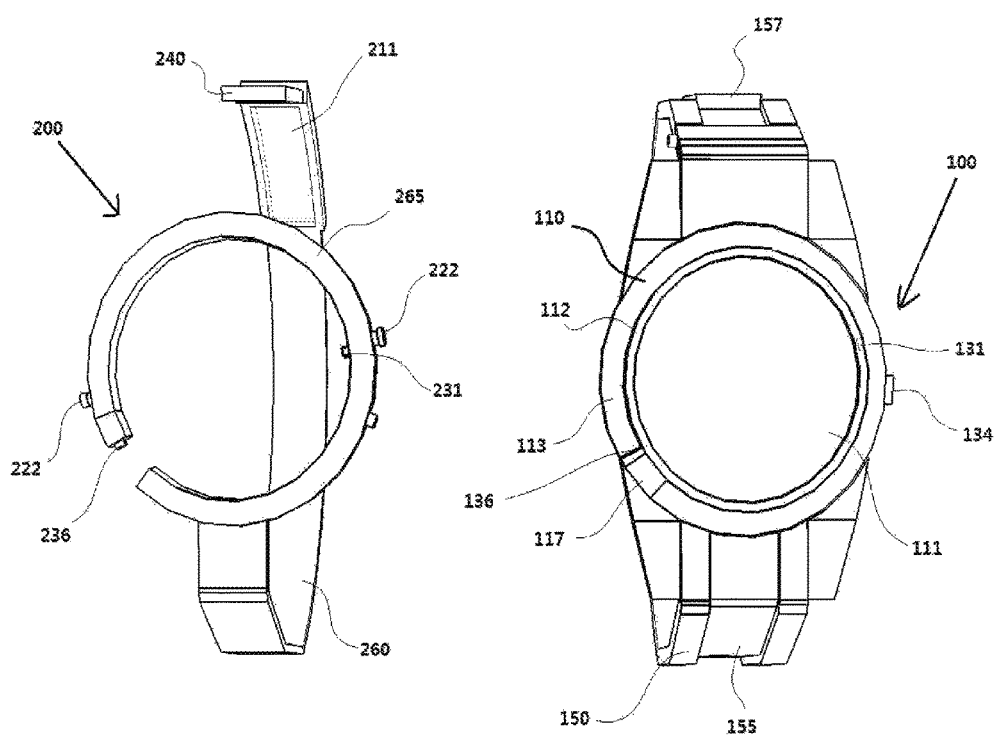
FIG. 1 is a plan view illustrating a wristwatch and smart glasses, according to an embodiment of the inventive concept.

Terms and words used in the specification and attached claims should not be interpreted as having meanings defined in commonly used and dictionaries, but should be interpreted as having meanings and concepts matched with the technical spirit of the inventive concept on the principle that 'the inventor can properly define the concept of a term to describe its invention in the best mode'.

Therefore, the configurations shown in the description and drawings in the present specification are merely preferred embodiments of the inventive concept and do not represent all the technical ideas of the inventive concept. Accordingly, it should be understood that various equivalents and modifications are present at the filing time of the subject application.

In the following description, detailed descriptions of well-known functions or constructions will be omitted because they would obscure the inventive concept in unnecessary detail. Since the suffixes "sensor", "module" "unit" and "part" for elements used in the following description are given and interchanged for easiness in making the description, they do not have distinct meanings or functions.

According to the inventive concept, as the use of a wristwatch is possible and the use of smart glasses are possible by utilizing a portion or an entire portion of elements of the wristwatch, the portability of the smart glasses and the convenience of use of the smart glasses can be improved.

Accordingly, the smart glasses may include a control unit, an output unit, an input unit, a wireless communication unit, a sensor unit, a camera unit, a power supply unit, an interface unit or the like to perform the function of the smart glasses. The smart glasses described on this specification may have elements larger than or smaller than the above-described elements.

More detailed functional method of the smart glasses differs from the intention of the inventive concept. Accordingly, the following description will be made while focusing on the use method of the smart glasses and the inherent functions thereof according to the purpose of the inventive concept, instead of the functional contents of the typical smart glasses.

In addition, one or more manners may be present to realize a transparent display part of smart glasses, and the detailed examples of the transparent display part is an OLED or a prism, which is collectively referred to as "transparent display part". Herein, the manner to realize the transparent display part is not specified. In addition, an elastic material to be described later may include rubber, urethane, silicone, TPU, or the like, but the inventive concept is not limited thereto.

According to embodiments illustrated in accompanying drawings, a wristwatch may have various shapes, various sizes, a curved state, or the like. Accordingly, an outer appearance, such as the shape, the size, or the curved state, of a temple tip to be described below is not limited to examples illustrated in the drawings.

The above objects and features of the inventive concept will be more apparently understood with reference to the following detailed description and accompanying drawings. Hereinafter, exemplary embodiments of the inventive concept will be described with reference to accompanying drawings.

Figure 2:
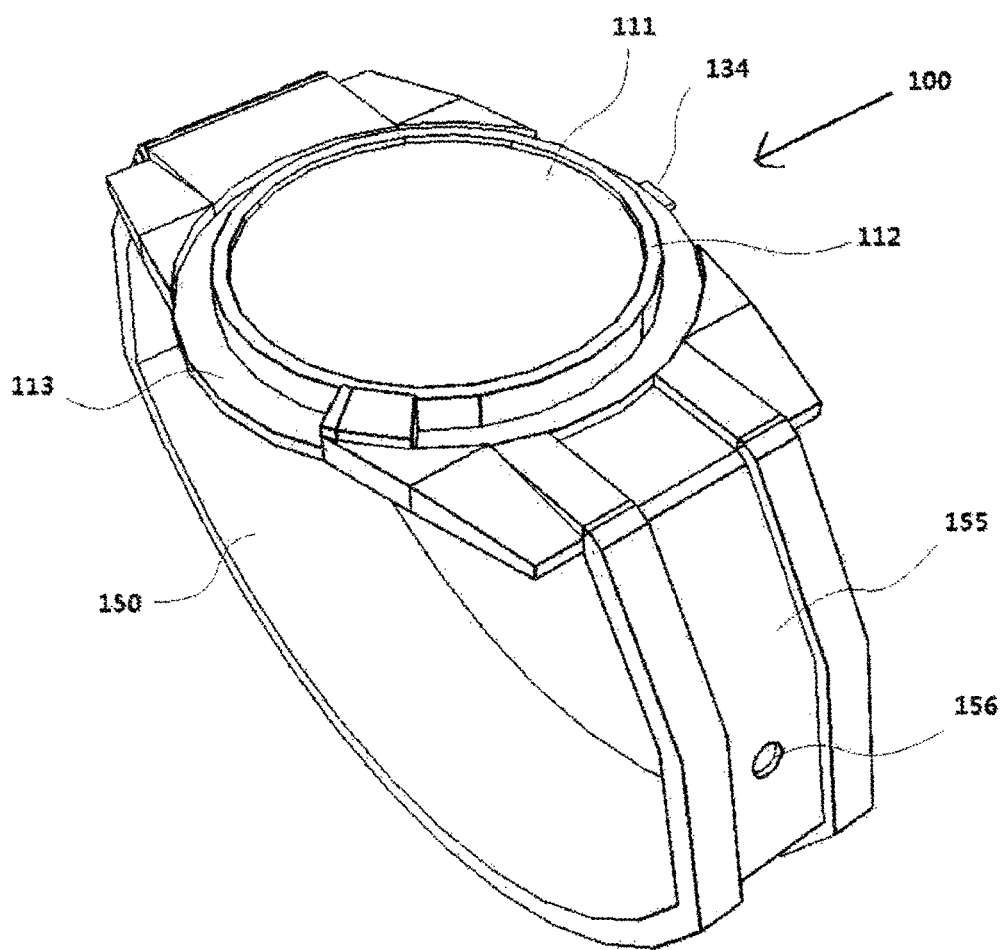
FIG. 2 is a perspective view of a wristwatch illustrated in FIG. 1, according to an embodiment of the inventive concept.
Figure 3:
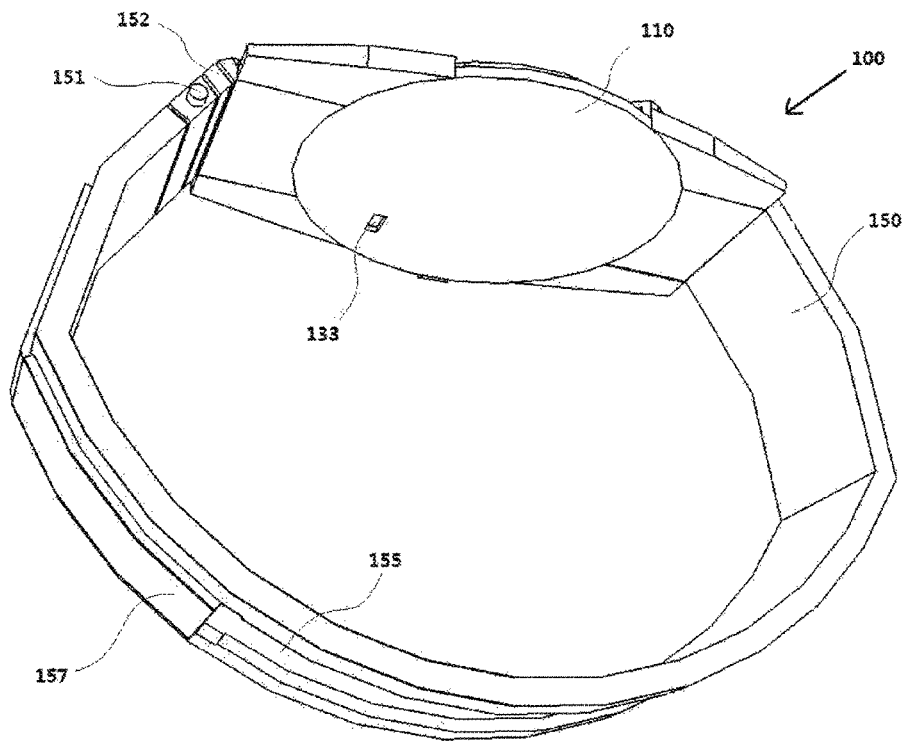
FIG. 3 is a bottom-side perspective view of a wristwatch illustrated in FIG. 1, according to an embodiment of the inventive concept.

FIG. 1 is a plan view illustrating a wristwatch 100 and smart glasses 200, according to an embodiment of the inventive concept, and FIGS. 2 and 3 are a top-side perspective view and a bottom-side perspective view of the wristwatch 100 illustrated in FIG. 1, respectively.

The inventive concept relates to the smart glasses 200, a temple tip 265 of which makes contact with the wristwatch 100 and has the shape of a portion or an entire portion of an outer frame 112 of a display unit 111 provided in the wristwatch 100 such that the temple tip 265 serves as a bezel or a case body 117. In more detail, the wristwatch 100 includes a watch body 110 serving as a core element of the wristwatch 100. The watch body 110 may include an analog clock dial or a digital liquid crystal display (LCD) screen serving as an element which is able to determine the usage sate of the inventive concept. The watch body 110 includes the display unit 111 serving as an input unit if the display unit 111 includes a touch screen, the outer frame 112 surrounding the display unit 111, and a seating part 113 having the shape corresponding to the outer frame 112 such that the temple tip 265 of the smart glasses 200 is securely mounted on the seating part 113. The seating part 113 is an element provided to securely mount and support the temple tip 265 of the smart glasses 200 on the watch body 110. Since the seating part 113 has the form of a plane making contact with the temple tip 265, the seating part 113 typically has the shape corresponding to the bottom surface of the temple tip 265.

Figure 4:
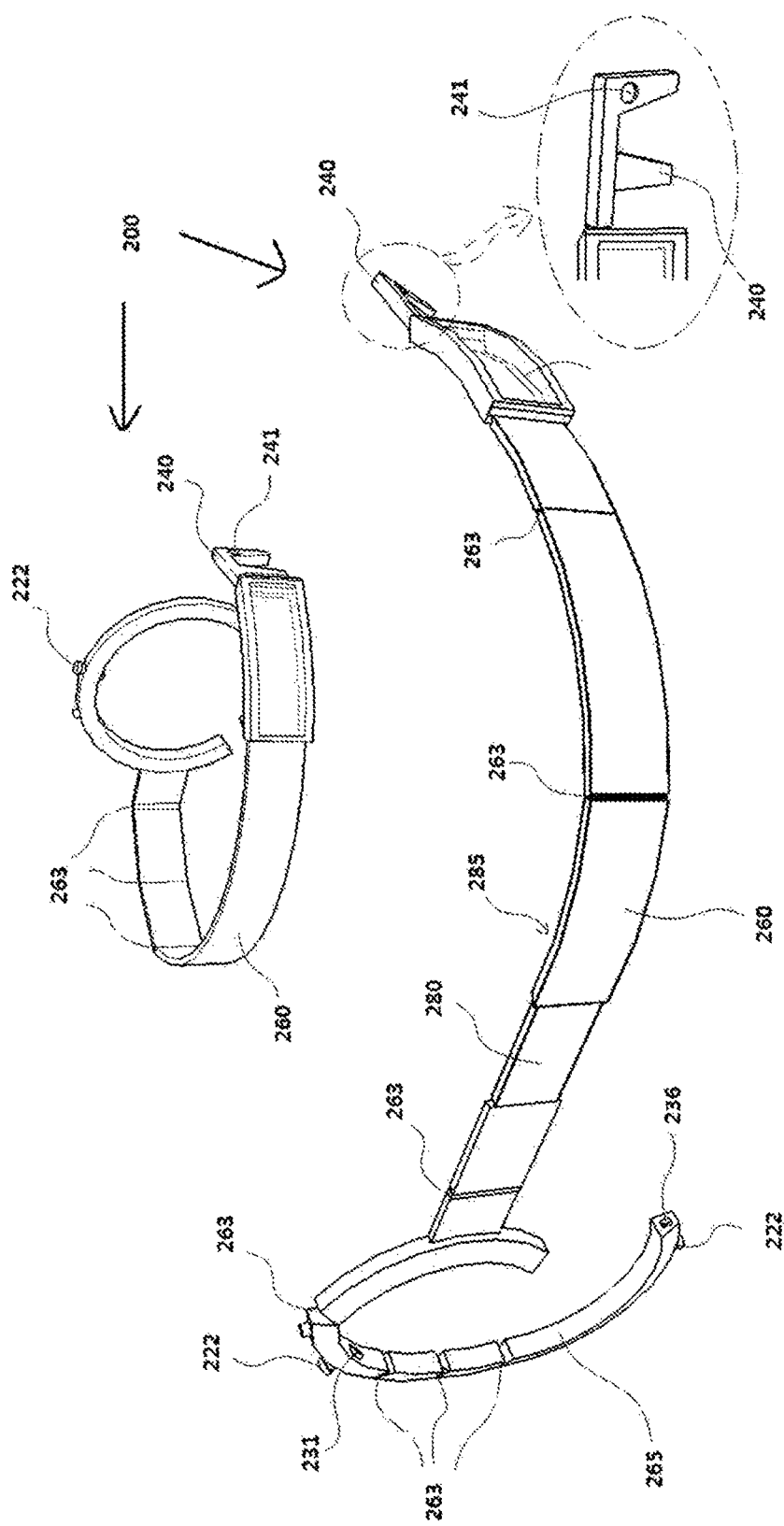
FIG. 4 is a perspective view of the smart glasses illustrated in FIG. 1, according to an embodiment of the inventive concept.
Figure 5:
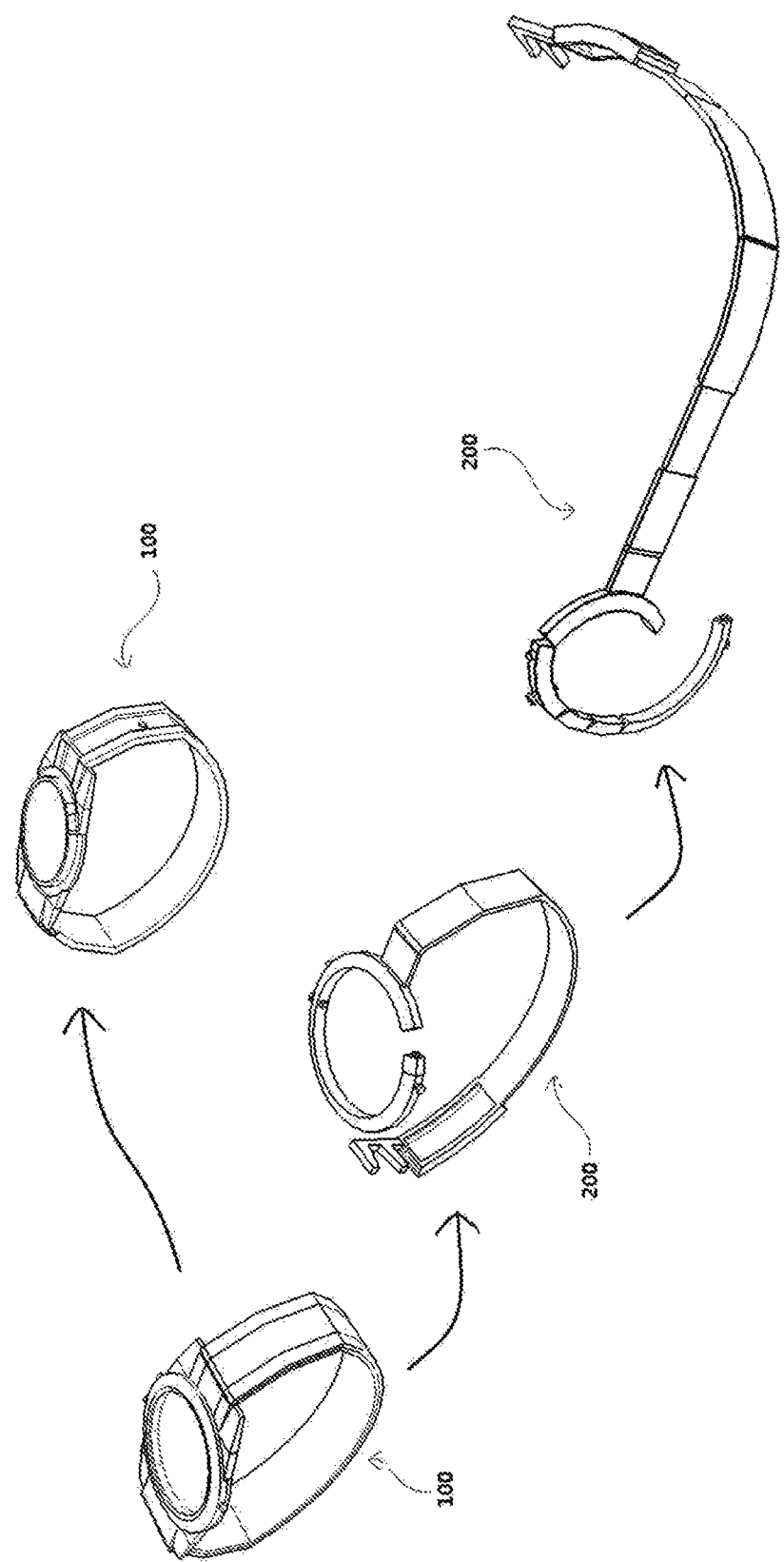
FIG. 5 is a view illustrating the procedure of transforming into the smart glasses illustrated in FIG. 1, according to an embodiment of the inventive concept.

FIG. 4 is a perspective view of the smart glasses 200 illustrated in FIG. 1, according to an embodiment of the inventive concept.

A band 150 of the wristwatch 100 includes a buckle unit 151 and a length adjustment unit 152 to make coupling and adjust the length of the band 150. In addition, the band 150 includes a protective cover 157 and a band seating part 155 to securely mount a temple 260, a nose pad 240, and a transparent display part 211 of the smart glasses 200. In addition, the band 150 includes a docking unit 156 provided in the band seating part 155 and the temple 260 to couple the band seating part 155 and the temple 260 to each other, and, according to an embodiment, a magnet coupling unit manner is employed to the extent of suppressing an electro-magnetic interface (EMI).

As illustrated in FIG. 4, the temple 20 and the temple tip 265 of the smart glasses 200 may include one or more joint parts 263. In addition, the joint part 263 is formed of a shape memory material and thus automatically transformed into a memorized shape when decoupled from the wristwatch, such that the temple 20 and the temple tip 265 may be comfortably mounted on the face of a wearer. In addition, an inner frame 280, which is retractably provided inside the temple 260, is exposed to adjust the length of the smart glasses 200, and, according to an embodiment, a sliding rail manner may be representatively employed.

In addition, a whole frame 285, which includes the temple tip 265, the temple 260, and the nose pad 240, and the band 150 of wristwatch 100 are formed of an elastic material to have elasticity.

In addition, the smart glasses 200 may be provided therein with a detaching sensor (not illustrated) to automatically perform an on/off function of the smart glasses 200 by sensing the detaching of the smart glasses 200 from the wristwatch 100. This is necessary for minimizing power consumption by automatically recognizing the unused state of the smart glasses 200 and for minimizing the distinguishment between operations to maximize the convenience of a user. The shape of the detaching sensor is not limited to a physical or functional shape. According to an embodiment, when the smart glasses 200 are decoupled from the wristwatch 100, the smart glasses 200 receive a decoupling signal from a charging module 236 to automatically become in an On state. When the smart glasses 200 are coupled again, the smart glasses 200 receive a coupling signal from the charging module 236 to become in an Off state. In addition, when a user manually switches the state of the smart glasses 200, the user may press a power button 134 of the temple tip 265 for a predetermined period to switch the On/Off state of the smart glasses 200, similarly to a typical smartphone.

The sensor provided in the smart glasses 200 is not limited to the detaching sensor, but may include one or more sensors and cameras to acquire the information on a wearer or the information on an environment surrounding the smart glasses 200 and the wearer. For example, the sensor may include at least one of a proximity sensor, an illumination sensor, an acceleration sensor, a magnetic sensor, a G-sensor, a gyroscope sensor, a motion sensor, an RGB sensor, an infrared (IR) sensor, an ultrasonic sensor, an optical sensor, a microphone, a battery gauge, an environmental sensor (for example, a barometer, a hygrometer, a thermometer, a radiation sensor, a thermal sensor, a gas sensor, or the like), a chemical sensor (for example, an electric nose, a healthcare sensor, a biometric sensor, or the like), a camera (for example, a front camera, an iris camera, or the like), but the inventive concept is not limited thereto. Meanwhile, the smart glasses 200 may combine and utilize multiple pieces of information acquired from at least two sensors and at least two cameras among the sensors and the cameras described above.

In particular, regarding the position of the camera 241, when the camera 241 is mounted at a position of the nose pad 240, the camera 241 may more smoothly function as the iris camera and the front camera.

In addition, to charge power consumed by the smart glasses 200 when the temple tip 265 is securely mounted on the seating part 113 of the wristwatch 100, the wristwatch 100 has a battery embedded therein and includes a charging terminal 133 at one portion of the wristwatch 100 to supply power to the battery from the outside. The smart glasses 200 include a pair of charging modules 136 and 236 operating with the wristwatch 100 such that the smart glasses 200 are charged with the power of the wristwatch 100 when the smart glasses 200 is coupled to the wristwatch 100. The charging modules 136 and 236 and the charging terminal 133 may employ an electrical contact manner or a magnetic inductive wireless charging manner, but the inventive concept is not limited thereto.

As illustrated in FIG. 1, one or more locking units are included to perform a function of detaching the smart glasses 200 from the wristwatch 100, in which the locking unit includes a locking part 131 formed on the outer frame 112 of the display unit 111 and a locking protrusion 231 formed on the temple tip 265 of the smart glasses 200 to be locked into the locking part 131 or to be released from the locking part 131. Although FIG. 1 illustrates that the locking part 131 has a groove shape, the locking part 131 may have a protrusion shape instead of the groove shape. The temple tip 265 may be locked into the outer frame 112 of the display unit 111, or the locking of the temple tip 265 may be released from the outer frame 112, by the locking part 131 and the locking protrusion 231 of the locking unit The locking protrusion 231 may be formed on one outer surface of the temple tip 265, and a locking release button 222 for the locking protrusion 231 may be included as a means for helping the decoupling of the smart glasses 200 from the wristwatch 100. If the locking release button 222 is pressed, the locking protrusion 231 is retracted into the temple tip 265, such that the smart glasses 200 is decoupled from the wristwatch 100.

According to an embodiment, the charging module 236 illustrated in FIG. 1 performs the function of the locking protrusion for the locking unit together with the inherent function thereof.

The above-described coupling means according to an embodiment of the inventive concept does not exclude other coupling menses.

In addition, the shape of the temple tip 265 of the smart glasses 200 is not limited to the shape that the temple tip 265 is hung only on one ear differently from the shape of the temple tip 265 illustrated in FIG. 4. According to an embodiment, there is possible the shape of the smart glasses in which the temple tip of the smart glasses is dividable into two parts, the two parts are coupled to paired ends of the temple, respectively, the inner frame, the nose pad, and the transparent display part of the temple are exposed, after the temple tip is divided, to adjust the length of the smart glasses, and the two parts of the temple tip are hung on both ears of a user for the use of the smart glasses 200.

Figure 6:
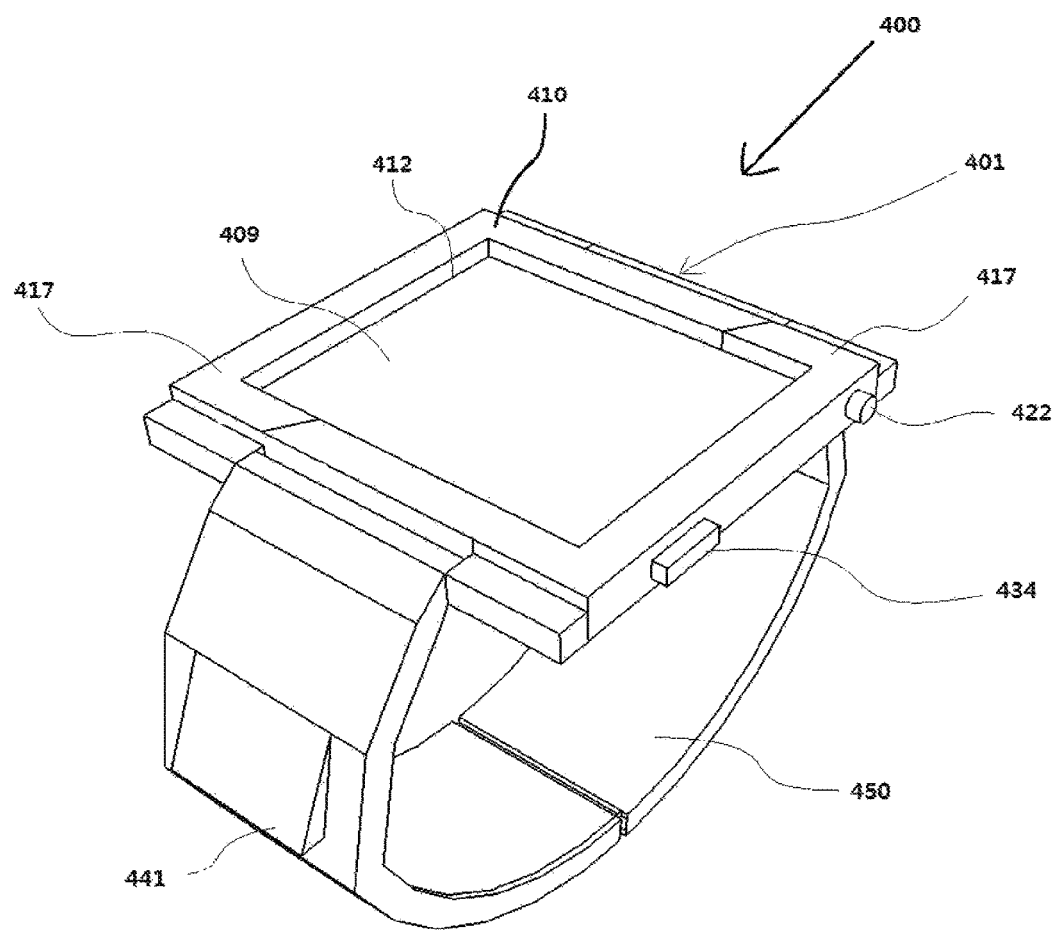
FIG. 6 is a perspective view illustrating a wristwatch serving as smart glasses, according to another embodiment of the inventive concept.
Figure 7:
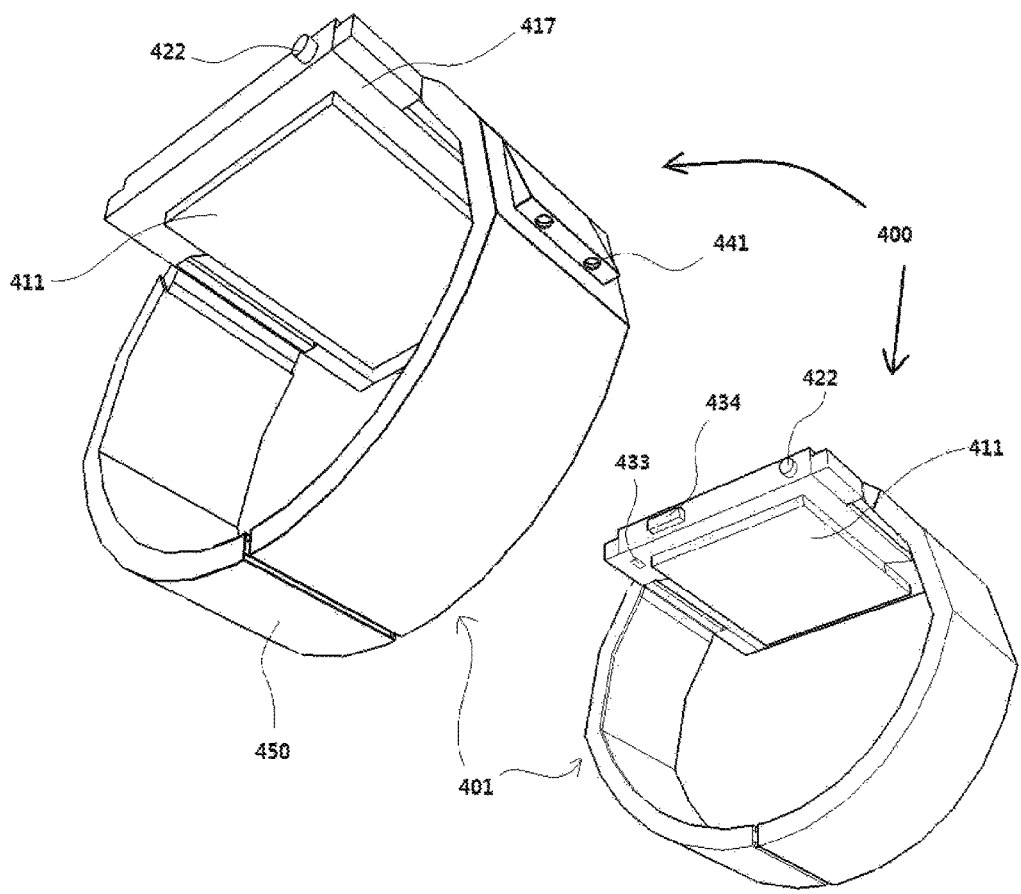
FIG. 7 is a bottom-side perspective view illustrating the wristwatch serving as the smart glasses, which is illustrated in FIG. 6, according to another embodiment of the inventive concept.

FIGS. 6 and 7 are perspective views illustrating a wristwatch 400 serving as smart glasses, another embodiment of the inventive concept.

The inventive concept relates to the wristwatch 400 having a watch body 410 including a display unit 409 formed on a top surface thereof and an outer frame 412 surrounding the display unit 409. The wristwatch 400 has a watch module 411 including the watch body 410 and the outer frame 412. A part of the wristwatch 400, which includes a bezel or a case body and has the shape corresponding to that of the watch module 411, is divided and transformed into a temple tip 417 of the smart glasses 402, which serves as the case body. Then, an inner frame 480, a transparent display part 418, and a nose pad 440 are exposed from a temple 450 serving as a band of the wristwatch 400 serving as smart glasses 402 and thus may be used for the smart glasses 402. A pair of temple tips 417 are provided and detachably coupled to the outer frame 412 of the watch module 411. The pair of temple tips 417 are coupled to each other by the temple 450 and the temple 450 is transformable to a band put on a wrist.

Figure 8:
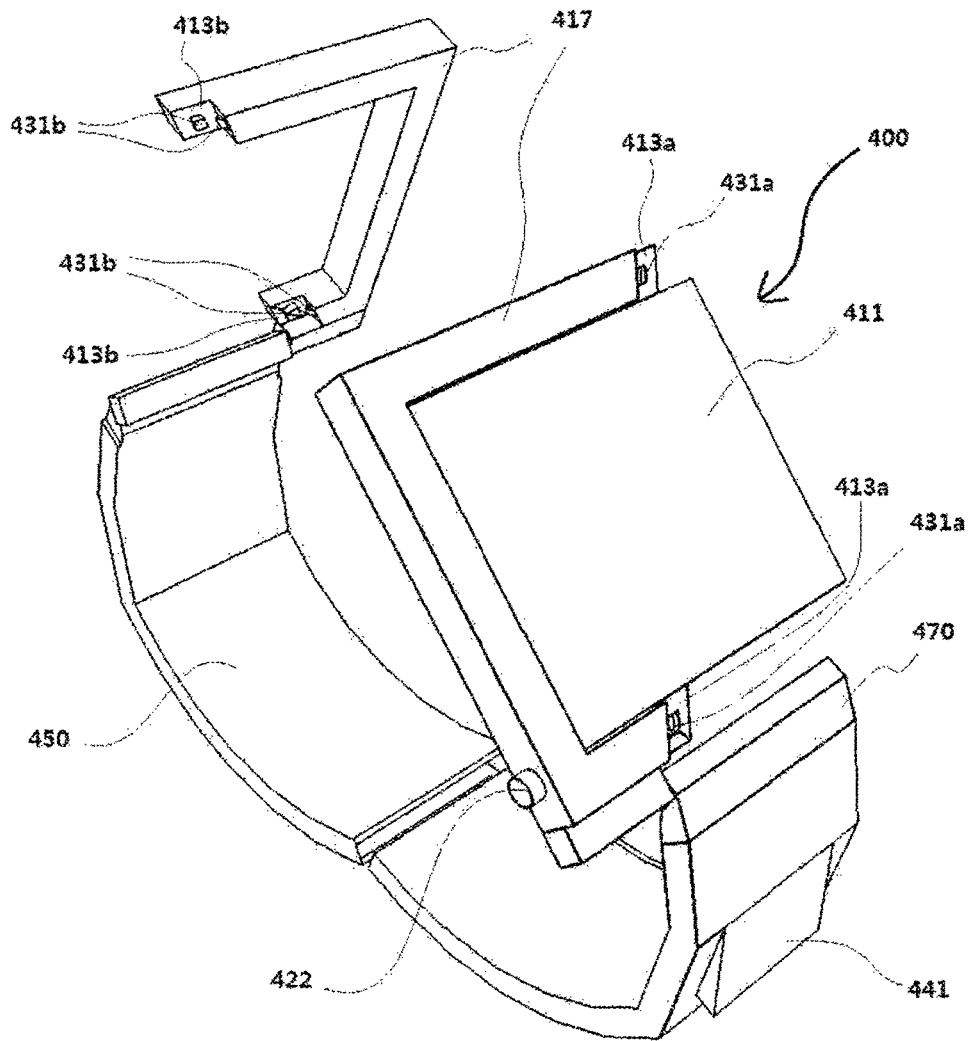
FIG. 8 is a perspective view illustrating the decoupling state of the wristwatch serving as the smart glasses, which is illustrated in FIG. 6, according to another embodiment of the inventive concept.

FIG. 8 is a perspective view illustrating the decoupling state of the wristwatch 400 serving as the smart glasses 402 illustrated in FIG. 6, according to another embodiment of the inventive concept.

As illustrated in FIG. 8, one or more locking units are included to perform a function of detaching the temple tip 417 serving as a case body of the wristwatch. The one or more locking units include locking parts 431*a* formed on seating surfaces 413a of the temple tip 417 serving as the case body and locking protrusion 431b formed on seating surfaces 413b, which are paired with seating surfaces 413a, and corresponding to the locking parts 431a.

The temple tips 417 serving as the case body include one or more seating surfaces 413a and 413b, which are paired with each other, correspond to each other, and include one or more locking units having the locking protrusion 431b and the locking part 431a, which are paired with each other and correspond to each other, to perform the function of detaching the temple tip 417 serving as the case body.

In more detail, if a wearer wants to transform the wristwatch 400, which is in use, into the smart glasses 402 and presses a locking release button 422 of the wristwatch 400, the locking protrusion 431b retracts into the temple tip 417 serving as the case body and the temple tip 417 serving as the case body of the wristwatch 401 couples the watch module 411 to one side thereof and is decoupled to perform the inherent function thereof.

In this case, to adjust the direction of the temple tip 417, a rotational part 470 is provided at one side. Accordingly, the direction of the temple tip 417 may be adjusted by rotating the rotational part 470

Figure 9:
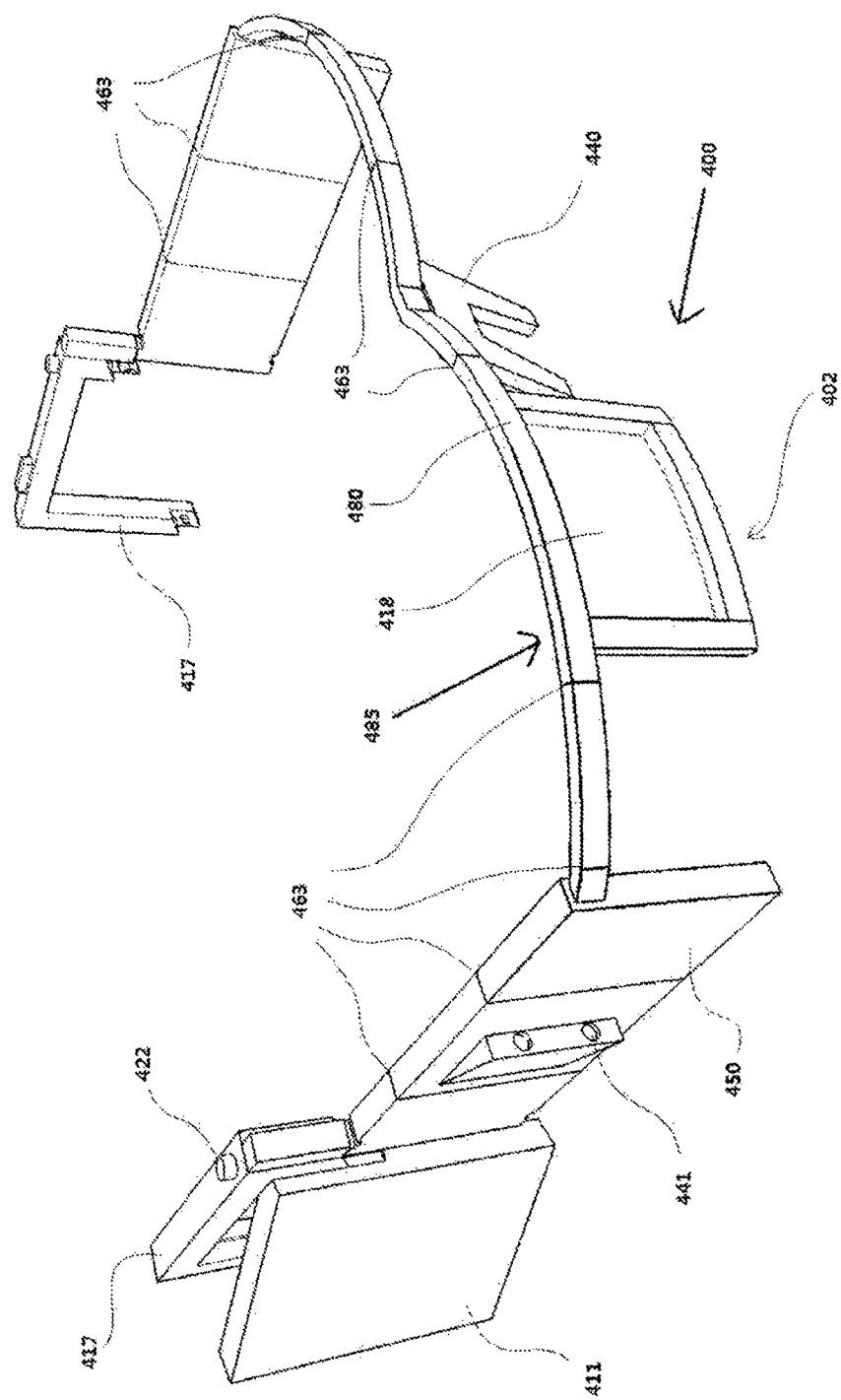
FIG. 9 is a perspective view illustrating a wristwatch serving as smart glasses, which is illustrated in FIG. 6, according to another embodiment of the inventive concept.
Figure 10:
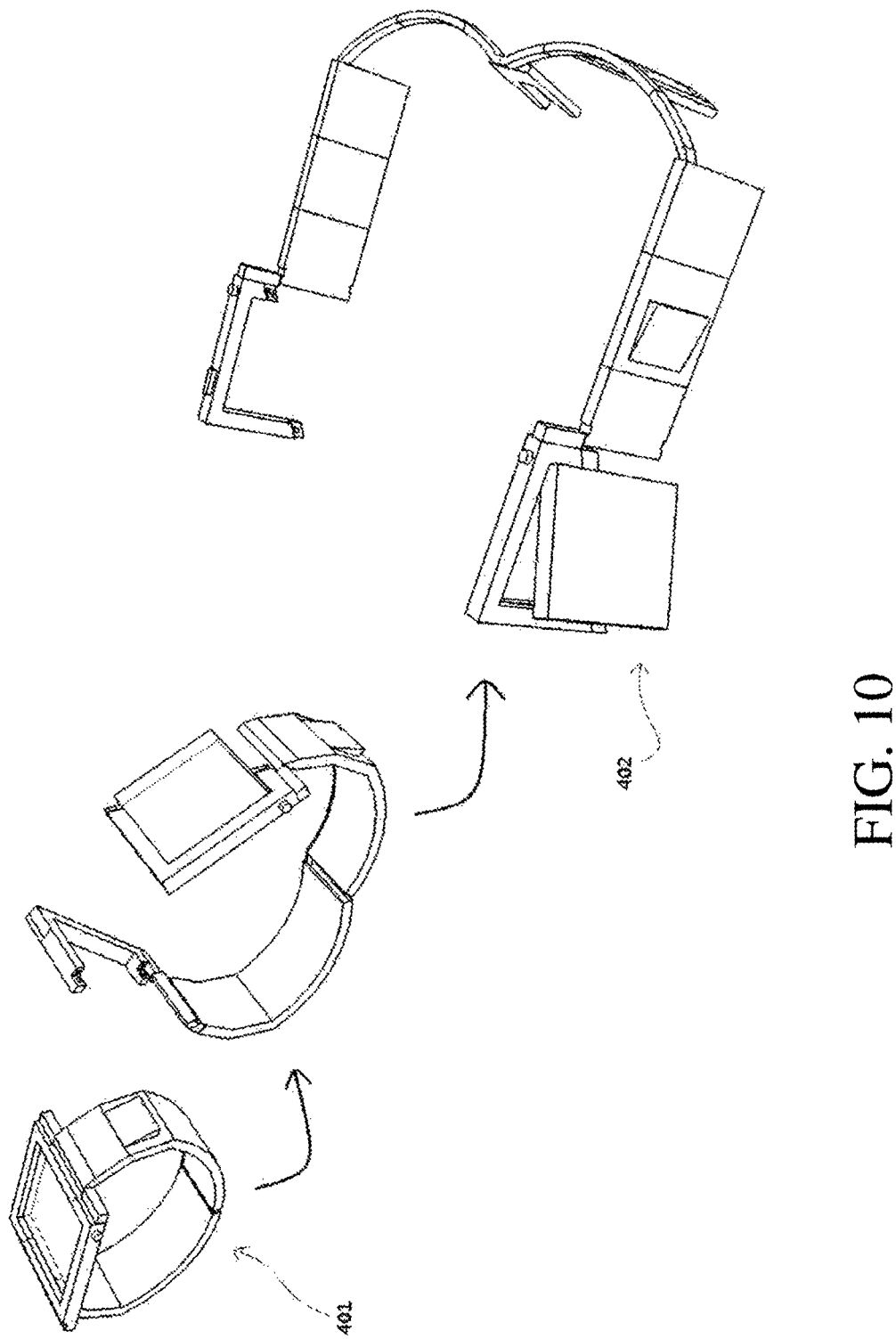
FIG. 10 is a view illustrating the procedure of transforming into the smart glasses illustrated in FIG. 6, according to another embodiment of the inventive concept.

FIG. 9 is a perspective view illustrating the wristwatch 400 serving as the smart glasses 402 illustrated in FIG. 6, according to another embodiment of the inventive concept.

Thereafter, the inner frame 480, the transparent display part 418, and the nose pad 440 may be exposed from the inner part of the temple 450 serving as the band and thus may be used for a frame of the smart glasses 402. In addition, the length of the temple 450 serving as the band may be adjusted based on the exposed extent of the inner frame 480 retractably provided inside the temple 450. According to an embodiment, a sliding rail manner may be representatively employed. The transparent display part 418, which displays an image, is retractably provided inside the temple 450.

In addition, the whole frame 485, which includes the temple 450 serving as the band, the temple tip 417 serving as the case body, and the nose pad 440, may include an elastic material to have elasticity and thus may be easily put on the hand and the face of a user.

As illustrated in FIG. 9, one or more joint parts 463 may be provided. In addition, the joint part 463 is formed of a shape memory material to help the smart glasses 402 be comfortably put on the face of a wearer in the use of the smart glasses 402.

The smart glasses 402 include the functions of the smart glasses described above. Further, in the watch module 411 including the display unit 409 formed on the top surface thereof, a touch screen is mounted on an opposite side of the display unit 409, thereby serving as an input device in the form of a touch pad when the smart glasses 402 is used. If the watch module 411 is positioned at the temple tip 417, which serves as the case body, of the temple 450 serving as the band, which is opposite to the temple 450 positioned at the side of the rotational part 470, the watch module 411 may serve as the input device by using the touch screen of the display unit 409. In this case, the rotational part 470 may be unnecessary.

Herein, reference numeral 433, which is not described, represents a charging terminal, reference numeral 434 represents a power button, and reference numeral 441 represents a camera used to capture an image.

Figure 11:
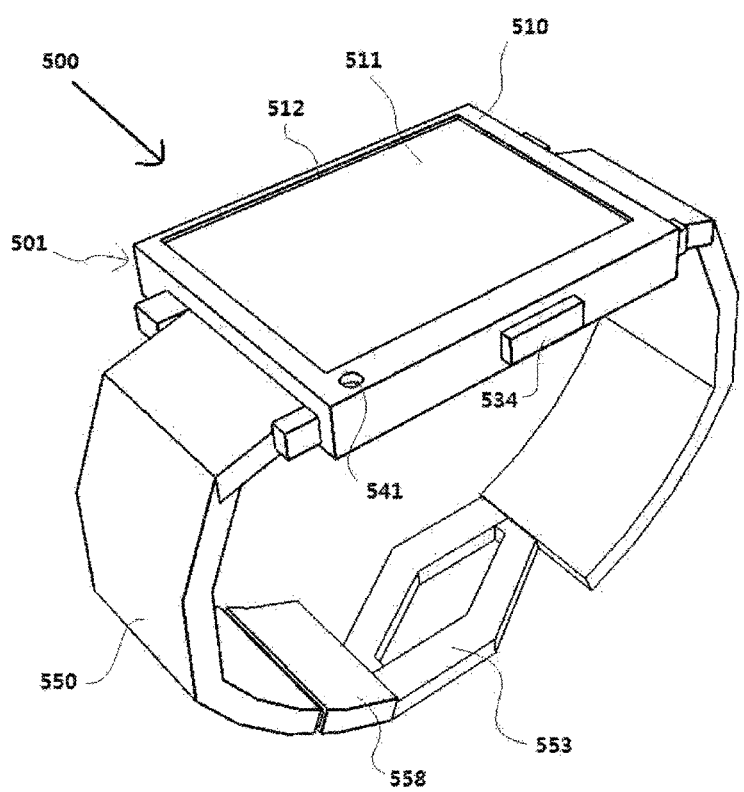
FIG. 11 is a perspective view illustrating a wristwatch serving as smart glasses, according to still another embodiment of the inventive concept.

FIG. 11 is a perspective view illustrating a wristwatch 500 serving as smart glasses, according to still another embodiment of the inventive concept.

The inventive concept has a feature of the wristwatch 500 serving as smart glasses, which includes a transparent display part 511 formed on a top surface thereof to display time or an image, an outer frame 512 surrounding the display unit 511, a lens frame 510 constituting a watch body having the shape corresponding to the shape of the outer frame 512, a pair of temples 550 serving as a band coupled to the lens frame 510 serving as the watch body, and a pair of temple tips 553 serving as a buckle coupling the pair of the temples 550 serving as the band to each other. The pair of temples 550 serving as the band is provided on the lens frame 510 while interposing the transparent display part 511 between the pair of temples 550, thereby being transformable into the band to be put on a wrist. In addition, the pair of temple tips 553 serving as the buckle is separately coupled to the pair of temples 550 serving as the band.

Figure 12:
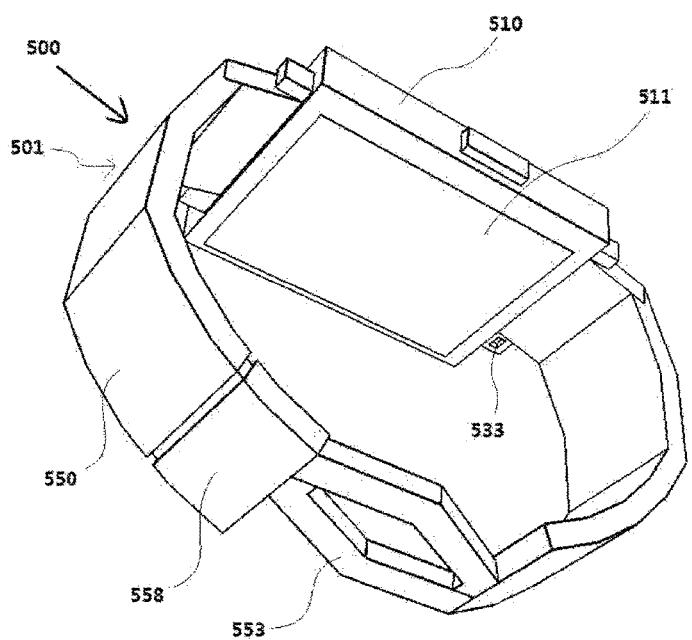
FIG. 12 is a bottom-side perspective view illustrating the wristwatch serving as the smart glasses, which is illustrated in FIG. 11, according to still another embodiment of the inventive concept.

FIG. 12 is a bottom-side perspective view illustrating the wristwatch 500 serving as the smart glasses illustrated in FIG. 11, according to still another embodiment of the inventive concept.

According to a more detailed embodiment, if a wearer wants to transform the wristwatch 501 into smart glasses 502 during the use as the wristwatch 501, the wearer may decouple the pair of temple tips 553 serving as the buckle from each other by applying force to the pair of temple tips 553 serving as the buckle, which are coupled to each other through magnetism in the extent of suppressing EMI. To adjust the direction of the temple tip 553 serving as the buckle, a rotational part 558 is provided to the temple serving as the band. Accordingly, the direction of the temple tip 553 serving as the buckle may be adjusted by rotating the rotational part 558.

In this case, the coupling manner between the pair of temple tips 553 serving as the buckle is limited to the magnetic-coupling manner of a buckle. As illustrated in FIG. 12, the directions of the temple tips need be not offset from each other. In this case, it is unnecessary to provide the rotational part 558. As long as the function of the temple tip and the functions of the band and the buckle are performed, the temple tips and the band and the buckle may be provided in various forms and various manners.

Figure 13:
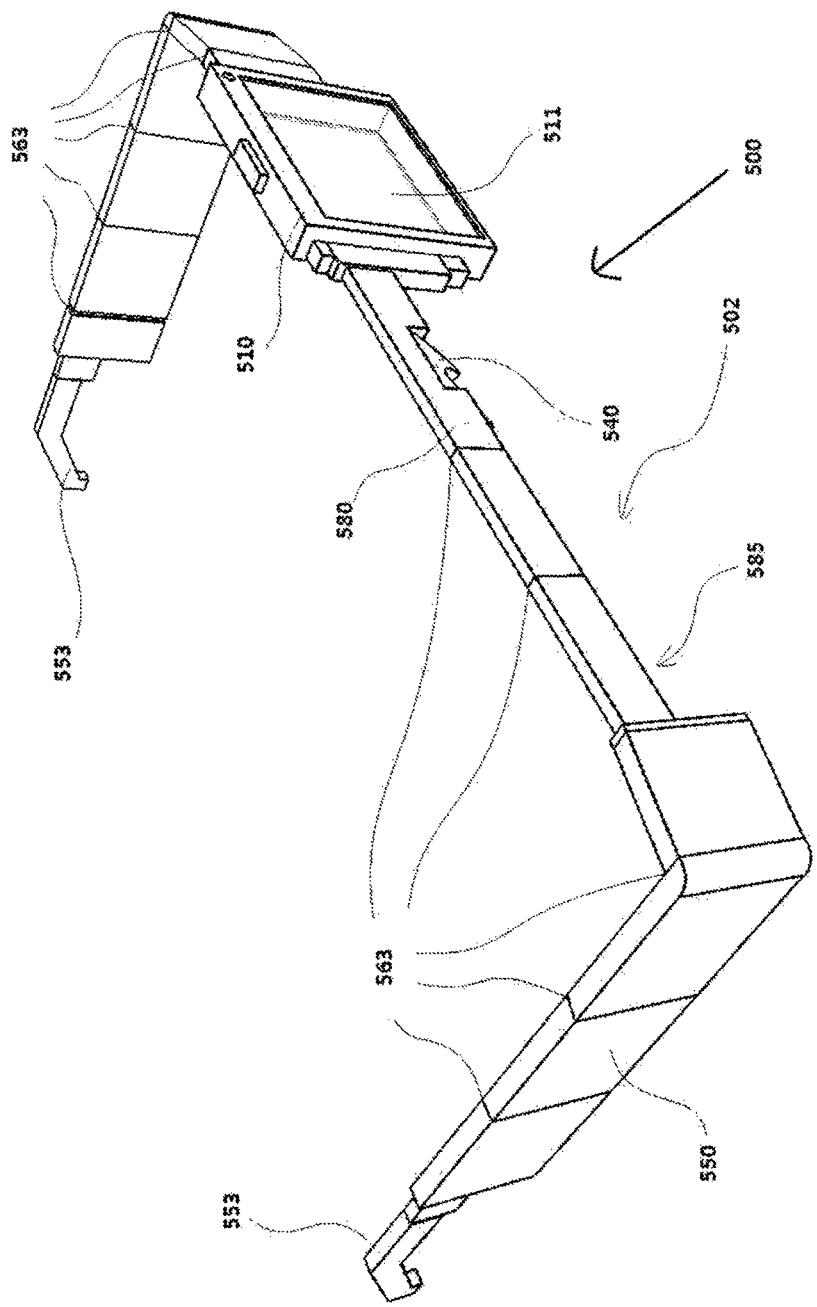
FIG. 13 is a perspective view illustrating the smart glasses of the wristwatch serving as the smart glasses, which is illustrated in FIG. 11, according to still another embodiment of the inventive concept.
Figure 14:
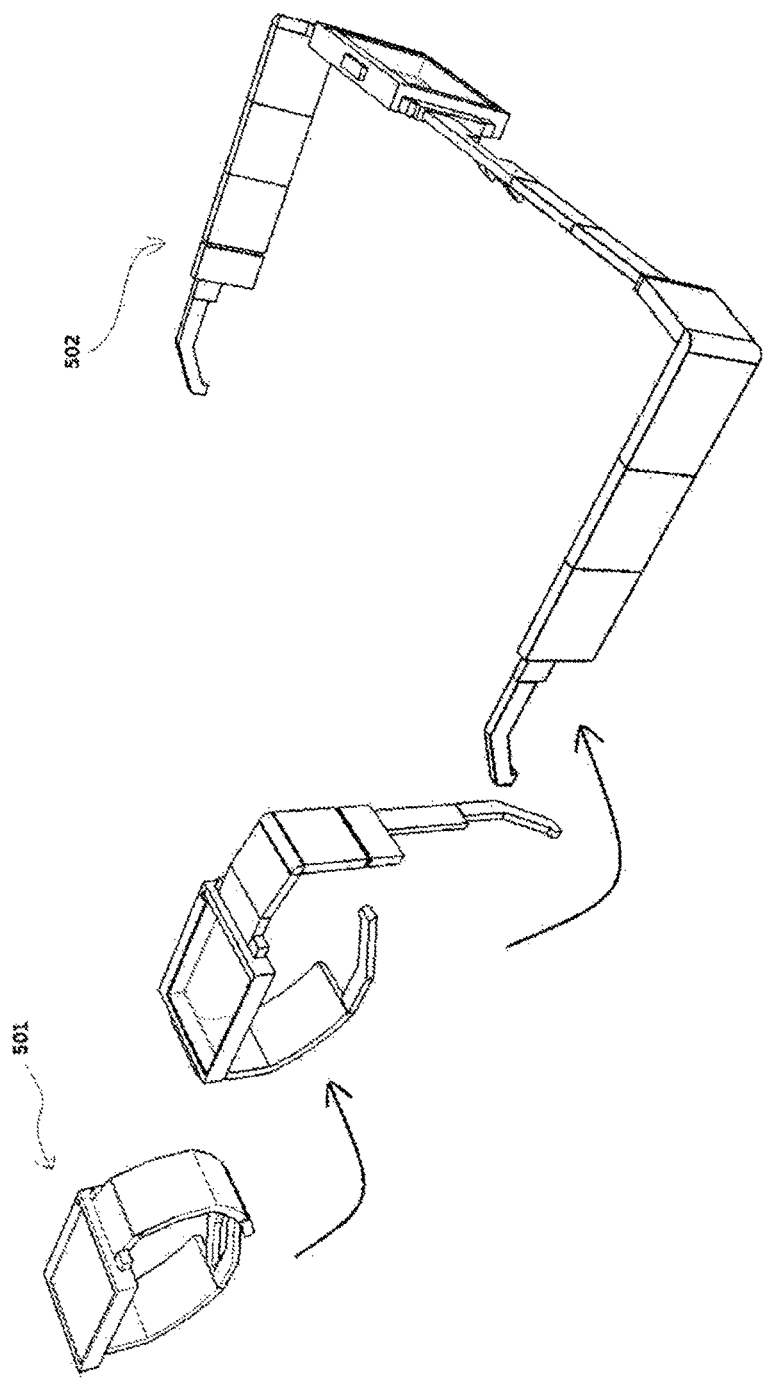
FIG. 14 is a view illustrating the procedure of transforming into the smart glasses illustrated in FIG. 11, according to still another embodiment of the inventive concept.

FIG. 13 is a perspective view illustrating the smart glasses of the wristwatch 500 serving as the smart glasses illustrated in FIG. 11, according to still another embodiment of the inventive concept.

In more detail, after the temple tips 553 serving as the buckle are separated, the inner frame 580 and the nose pad 540 are exposed from the inner part of the temple 550 serving as the band, thereby adjusting the whole length suitably for the face of a wearer, so that the use of the smart glasses 502 is possible. According to an embodiment, the sliding rail manner is representative as the manner of adjusting the length.

In addition, the whole frame 585, which includes the temple 550 serving as the band, the temple tip 553 serving as the buckle, the nose pad 540, and the lens frame 510 serving as the watch body may include an elastic material to have elasticity and thus may be easily put on the hand and the face of a user.

As illustrated in FIG. 13, one or more joint parts may be provided. In addition, the joint part 563 is formed of a shape memory material to help the smart glasses 502 be comfortably put on the ears of a wearer in the use of the smart glasses 502.

Herein, reference numeral 533, which is not described, represents a charging terminal, reference numeral 534 represents a power button, and reference numeral 541 represents a camera used to capture an image.

In addition, the functions of the present smart glasses 402 and 502 have the functions of the smart glasses 200 described above, and modules, sensors, and a battery for the function may be embedded in the case body, the temple, and the temple tip serving as the buckle.

Figure 15:
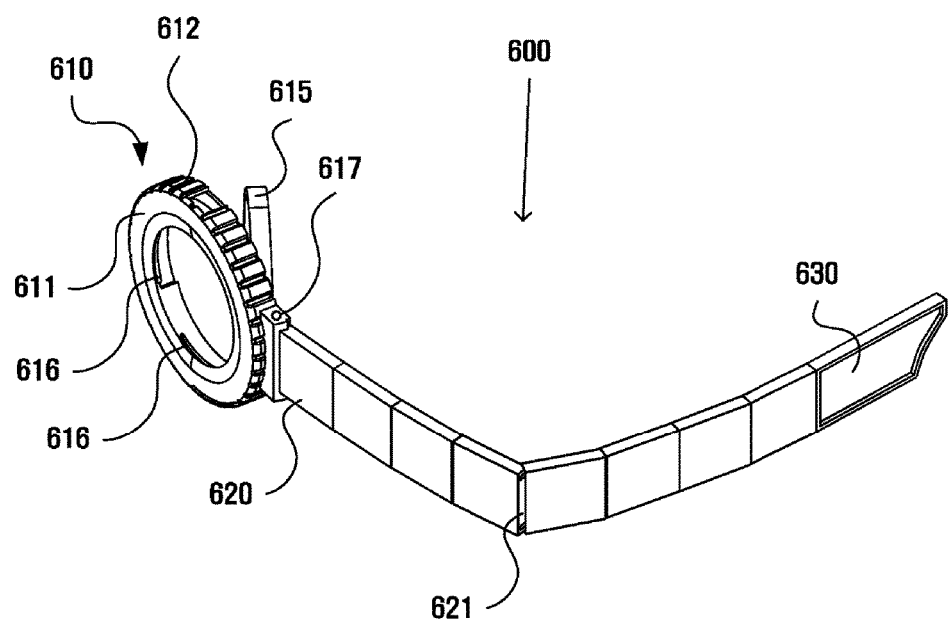
FIG. 15 is a perspective view illustrating a wristwatch serving as smart glasses, according to still another embodiment of the inventive concept.
Figure 16:
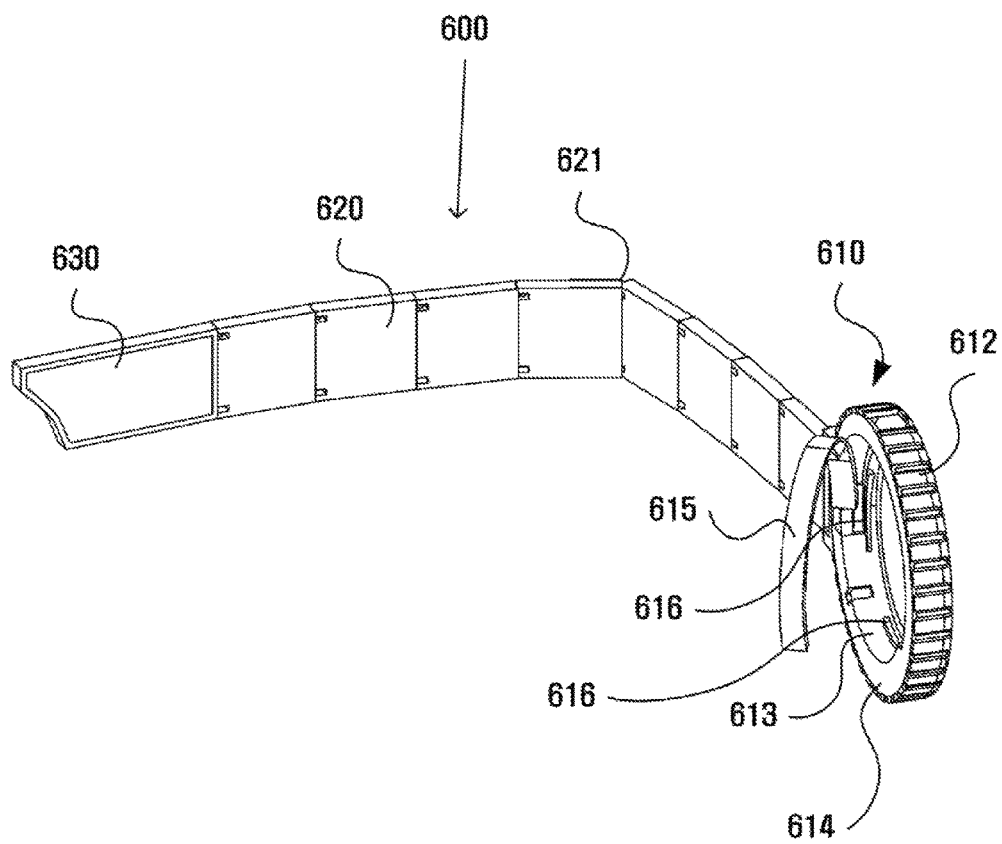
FIG. 16 is a bottom-side perspective view illustrating the smart glasses, which is illustrated in FIG. 15 according to still another embodiment of the inventive concept.

FIG. 15 is a perspective view illustrating smart glasses 600 according to still another embodiment of the inventive concept, and FIG. 16 is a bottom-side perspective view illustrating the smart glasses 600 illustrated in FIG. 15 according to still another embodiment of the inventive concept.

Identically or similarly to the smart glasses 200 according to an embodiment of the inventive concept described with reference to FIG. 1, the smart glasses 600 according to still another embodiment of the inventive concept include a temple frame 610, which makes contact with the wristwatch in the shape of a portion or an entire portion of an outer frame of a display unit provided in the wristwatch, to serve as a bezel or a case body. In addition, the temple frame 610 includes a temple tip 615 such that the temple frame 610 is put on the ear of a user.

In more detail, as illustrated in FIG. 1, the temple frame 610 of the smart glasses 600 may be mounted on and supported by the watch body of the wristwatch, in the form of being detachable from the wristwatch having the seating part 113.

Referring to FIGS. 15 and 16, the smart glasses 600 include the temple frame 610, a temple 620, and a transparent display part 630.

The shape and operation of the temple tip 615 may be variously provided depending on the shape of the outer frame of the display unit provided in the wristwatch. According to an embodiment, when the outer frame of the display unit in the wrist watch has an arc shape as illustrated in FIGS. 15 and 16, the temple tip 615 having the arc shape is formed on an inner surface 613 of the temple frame 610 to constitute at least a portion of the inner surface 613 of the temple frame 610. According to an embodiment, the temple tip 615 may have the shape of a semicircular arc or the shape of an arc having the central angle less than or greater than the central angle of the semicircular arc. Temple tips 615 having other various shapes are formed on the inner surfaces 613 of the temple frame 610 to constitute at least a portion of the inner surface 613 of the temple frame 610. Herein, regarding an example that the temple tip 615 constitutes at least a portion of the inner surface 613 of the temple frame 610, the inner surface 613 of the temple frame 610 and the inner surface of the temple tip 615 may form the same plane before the temple tip 615 is separated from the temple frame 610. Alternatively, a predetermined step may be formed between the inner surface 613 of the temple frame 610 and the inner surface of the temple tip 615. This refers to that the inner surface 613 of the temple frame 610 and the inner surface of the temple tip 615 may surround a portion or an entire portion of the outer frame of the display unit provided in the wristwatch. A rotational shaft is provided in one end portion or both end portions of the temple tip 615. Accordingly, the temple tip 615 may be coupled to the temple frame 610 rotatably about the rotational shaft. Although FIGS. 15 to 16 illustrate that the temple tip 615 constitutes at least a portion of the inner surface 613 of the temple frame 610, the temple tip 615 may constitute at least a portion of an outer surface 612, a top surface 611, or a rear surface 614 of the temple frame 610 by taking into consideration a user having large ears or wearing glasses.

The temple frame 610 and the temple 620 are hinged to each other and may be pivoted (i.e., folded and unfolded) about a predetermined shaft 617. The temple frame 610 is fitted into the watch body, thereby coupling the smart glasses 600 with the wristwatch. According to an embodiment, the temple frame 610 may include inner coupling steps 616 serving as one or more locking units which perform the function of decoupling the smart glasses 600 from the watch body. One or more inner coupling steps 616 may protrude from the inner surface 613 of the temple frame 610 while being spaced apart from each other by a predetermined distance. Although not clearly illustrated, an outer coupling step corresponding to the inner coupling step 616 may protrude from the outer frame of the display unit provided in the wristwatch. The temple frame 610 is fixedly fitted into the watch body by using the outer coupling step and the inner coupling step 616, thereby more securely coupling the smart glasses 402 with the wristwatch.

The temple 620 of the smart glasses 600 may include one or more joint parts 621. In addition, the joint parts 621 are formed of a shape memory material and thus are transformed into an automatically memorized shape in the case of the decoupling of the wristwatch. Accordingly, the joint parts 621 may be comfortably put on the face of a wearer.

In addition, the smart glasses 600 may be provided therein with a detaching sensor (not illustrated) to automatically perform an on/off function of the smart glasses 600 by sensing the detaching of the smart glasses 600 from the wristwatch. Similarly, the sensor provided in the smart glasses 600 is not limited to the detaching sensor, but may include one or more specific sensors and cameras to acquire the information on a wearer or the information on an environment surrounding the smart glasses 600 and the wearer.

Although not explicitly shown, if the temple tip is mounted on the seating part, the smart glasses 600 include one pair of charging modules (not illustrated) operating with the wristwatch such that the smart glasses may be charged with power of the wristwatch when the smart glasses 600 are coupled to the wristwatch.

As described above, according to the inventive concept, the smart glasses can be used as the smart glasses are easily and simply separated from the wristwatch having higher portability whenever the user wants to use the smart glasses only if the user puts on the wristwatch. Accordingly, the smart glasses can improve the portability and the convenience of use as compared to those of conventional smart glasses. In addition, the beauty of the wristwatch can be maintained since the elements of a typical wristwatch are used.

The effect of such an inventive concept is obviously predicable from the configuration of the inventive concept regardless of whether or not the inventor perceives it. Therefore, the above-described effect is not to be acknowledged shall be described some effects as any effects that the inventor has identified or existence according to the invention. The effect of the inventive concept is additionally understood through the whole statement of the specification. Even if the effect is not explicitly stated, if the effect is predicted by those skilled in the art which the inventive concept pertains, the effects can be considered produced through the specification.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A wristwatch comprising:
a watch body having a display unit including a seating part formed on an outer frame of the watch body; and
smart glasses having a temple tip detachably coupled to the seating part to constitute at least a portion of a case body or a bezel of the watch body and surrounding at least a portion of the outer frame of the display unit,
wherein the temple tip of the smart glasses is formed in a shape corresponding to the seating part of the watch body to surround the outer frame of the display unit in the watch body while being mounted on the watch body and supported by the watch body.

2. The wristwatch of claim 1, further comprising:
a band allowing a user to put the watch body on a wrist of the user, wherein the smart glasses include a temple, which extends from the temple tip and is detachably coupled to the band, and an inner frame retractably provided inside the temple such that a length of the temple is adjustable.

3. The wristwatch of claim 1, further comprising:
a transparent display part provided in a temple of the smart glasses to display an image.

4. The wristwatch of claim 3, further comprising:
a protective cover configured to securely mount the transparent display part.

5. The wristwatch of claim 1, wherein the watch body includes a battery and a charging terminal,
wherein the smart glasses include a charging module operating together with the watch body, and
wherein the smart glasses are charged with power of the watch body when the smart glasses are coupled to the watch body.

6. The wristwatch of claim 1, further comprising:
a locking unit including a locking part formed on the outer frame of the display unit and a locking protrusion formed on the temple tip of the smart glasses such that the locking protrusion is locked to the locking part or locking of the locking protrusion is released from the locking part,
wherein the locking unit locks the temple tip to the outer frame of the display unit or releases locking of the temple tip from the outer frame of the display unit.

7. The wristwatch of claim 1, wherein the temple tip surrounds only at least a portion of the outer frame of the display unit.

8. The wristwatch of claim 1, wherein the temple tip includes one or more joint parts.

9. A wristwatch comprising:
a watch body having a display unit including a seating part formed on an outer frame of the watch body;
a band allowing a user to put the watch body on a wrist of the user;
smart glasses having a temple tip, which is detachably coupled to the seating part to constitute a case body or a bezel of the watch body and surrounds the outer frame of the display unit, and a temple which extends from the temple tip and is detachably coupled to the band; and
an inner frame retractably provided inside the temple such that a length of the temple is adjustable.

10. The wristwatch of claim 9, further comprising:
a transparent display part is provided in the temple of the smart glasses to display an image.

11. The wristwatch of claim 10, further comprising:
a protective cover configured to securely mount the transparent display part.

12. The wristwatch of claim 9, wherein the watch body includes a battery and a charging terminal,
wherein the smart glasses include a charging module operating together with the watch body, and
wherein the smart glasses are charged with power of the watch body when the smart glasses are coupled to the watch body.

13. The wristwatch of claim 9, further comprising:
a locking unit including a locking part formed on the outer frame of the display unit and a locking protrusion formed on the temple tip of the smart glasses such that the locking protrusion is locked to the locking part or the locking of the locking protrusion is released from the locking part, wherein the locking unit locks the temple tip to the outer frame of the display unit or releases locking of the temple tip from the outer frame of the display unit.

14. The wristwatch of claim 9, wherein the temple tip surrounds only at least a portion of the outer frame of the display unit.

15. The wristwatch of claim 9, wherein the temple tip includes one or more joint parts.

16. The wristwatch of claim 9, wherein the temple includes one or more joint parts.

17. A wristwatch comprising:
a lens frame configured to surround a transparent display part which displays time or an image and to constitute a watch body;
a pair of temples provided on the lens frame while interposing the transparent display part between the pair of temples and being transformable into a band put on a wrist of a user;
a pair of temple tips mutually separately respectively coupled to the pair of temples; and
an inner frame retractably provided inside the pair of temples such that a length of the temple is adjustable.

18. The wristwatch of claim 17, wherein the temple tip includes one or more joint parts.

19. The wristwatch of claim 17, further comprising:
a rotational part interposed between the temple and the temple tip to adjust a direction of the temple tip.

* * * * *